United States Patent [19]

Johnson

[11] Patent Number: 4,570,402
[45] Date of Patent: Feb. 18, 1986

[54] CONNECTOR APPARATUS FOR MODULAR PANEL STRUCTURE

[75] Inventor: Bernard L. Johnson, Danville, Calif.

[73] Assignee: Universal Building Systems, Inc., San Jose, Calif.

[21] Appl. No.: 496,966

[22] Filed: May 23, 1983

[51] Int. Cl.⁴ .............................................. E04B 1/00
[52] U.S. Cl. ........................................ 52/241; 52/282;
52/584; 108/64; 211/90; 211/187; 312/263
[58] Field of Search ...................... 52/241, 243.1, 281,
52/282, 284, 285, 286, 584, 578, 825, 805, 804,
36, 580, 581; 248/243; 211/90, 187, 197;
108/64; 312/257 SK, 263; 269/242

[56] References Cited

U.S. PATENT DOCUMENTS

| | | | |
|---|---|---|---|
| 78,922 | 6/1868 | Brecht | 269/242 |
| 275,341 | 4/1883 | McLane | 269/242 |
| 1,605,169 | 11/1926 | Burbidge | 52/282 |
| 2,680,395 | 6/1954 | Christiansen | 269/242 |
| 2,766,858 | 10/1956 | Johnson et al. | 52/217 |
| 2,933,167 | 4/1960 | Keller | 52/580 |
| 2,962,133 | 11/1960 | Kivett et al. | 52/580 |
| 3,265,217 | 8/1966 | Biggs | 211/90 |
| 3,267,631 | 8/1966 | Hammitt | 52/771 |
| 3,282,006 | 11/1966 | Halsey et al. | 52/475 |
| 3,431,692 | 3/1969 | Freeman | 52/467 |
| 3,449,877 | 6/1969 | Beckman | 52/282 |
| 3,462,893 | 8/1969 | Kaiser | 403/172 |
| 3,648,419 | 3/1972 | Marks | 52/36 |
| 3,736,009 | 5/1973 | Juhnke | 312/257 SK |
| 3,848,364 | 11/1974 | Costruba | 52/36 |
| 3,921,347 | 11/1975 | Paisley | 52/36 |
| 4,038,790 | 8/1977 | Paisley | 52/36 |
| 4,145,856 | 3/1979 | Wise | 52/174 |
| 4,350,318 | 9/1982 | Gallis | 52/584 |

FOREIGN PATENT DOCUMENTS 2328860 12/1974 Fed. Rep. of Germany .......... 52/36

Primary Examiner—John E. Murtagh
Assistant Examiner—Andrew Joseph Rudy
Attorney, Agent, or Firm—Manfred M. Warren; Robert B. Chickering; Glen R. Grunewald

[57] ABSTRACT

Connector apparatus for joining structural components, such as posts 19 and panels 25, to form a modular structure. Posts are extruded members with T-shaped grooves 21 therein. Affixed to the panels are grooved rails 27 with corresponding T-shaped grooves. An adjacently positioned grooved post and panel rails are joined by connector assembly 31 which consists of two C-shaped channels 33 and 35, and a plurality of transversely extending threaded elements 39 that are threadedly engaged to the channels. The threaded elements have left and right hand threaded ends 38 and 40, each end threadedly engaging one channel, and when rotated, act to increase or decrease the distance between channels to lock or unlock the panel to the post. Periodically spaced slots 47 in the channel webs or on a U-shaped member secured to the webs permit brackets 48 to be mounted to the connector apparatus. Optionally, the connector can include an intermediate plate 37, which provides an acoustical and visual barrier and which is formed with tabs 51 for vertical registration of adjacent panels.

3 Claims, 4 Drawing Figures

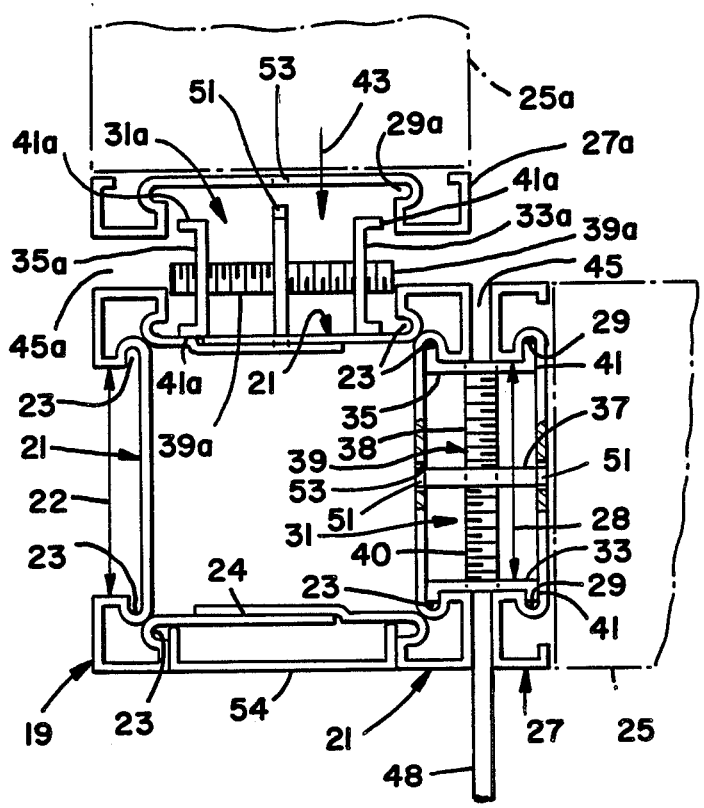
FIG_1
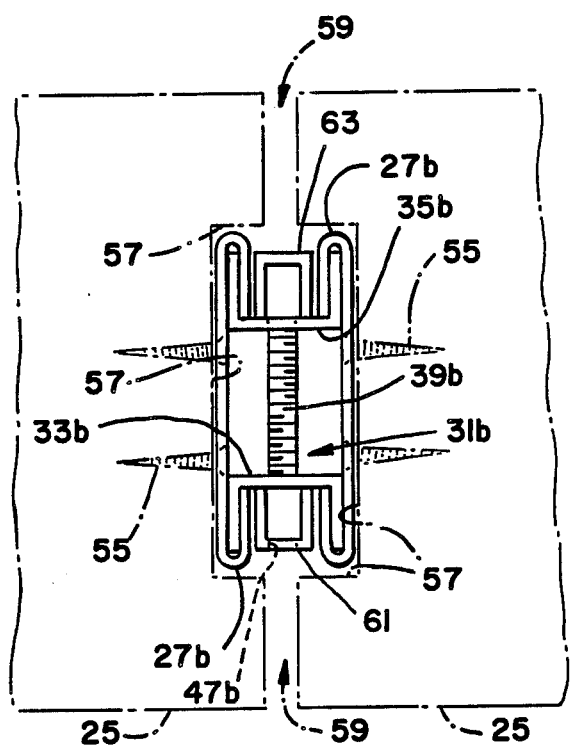
FIG_3

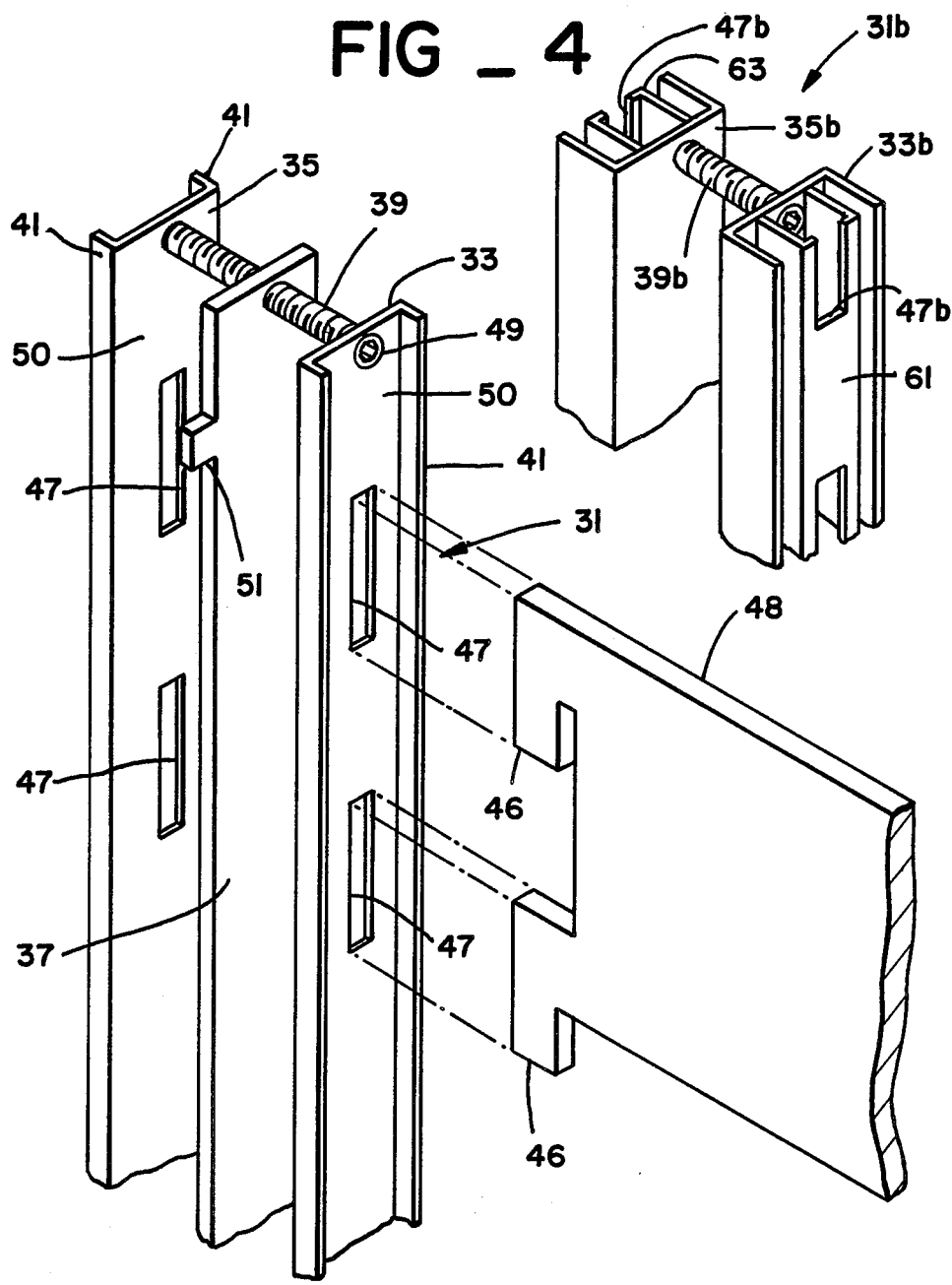

CONNECTOR APPARATUS FOR MODULAR PANEL STRUCTURE

BACKGROUND OF THE INVENTION

The present invention relates, in general, to connectors for modular structural units, and relates, more particularly, to a connector apparatus for joining panels and posts to form a modular panel structure and means for the mounting of brackets therefrom.

Modular panel structures have been commonly used in office buildings, schools, and factories for the erection of walls to form rooms, work spaces, and offices. Such modular panel structures usually included a plurality of vertically extending posts to which vertically oriented panels were joined or otherwise secured. It has been found to be desirable to attach brackets for shelves, desks, tables and other similar furniture to the modular panel structure to enhance its functional value.

A properly designed modular panel structure should meet several design criteria in function and appearance. It should be easily assembled and disassembled. Since some structures must extend from floor to ceiling, access to the top or bottom of the structure should not be required for assembly and disassembly. To minimize coverage of valuable floor space and to minimize safety hazards, panel connectors and bracket mounting means should be recessed. In addition, the structure should provide an acoustical barrier to promote a quiet office environment and should be aesthetically pleasing.

Prior modular panel structures have failed to meet these design criteria. Some structures have employed slotted or apertured posts into which bracket feet or hooks were inserted, with the panels secured by conventional fasteners to the brackets. Disadvantages to this approach included unsightly appearance and unsafe protruding fasteners. Other structures have fastened panels to posts using dove-tailed connectors that necessitated sliding each panel onto a post. This type of structure is difficult to assemble where floor to ceiling walls are required. Still other units employ plug-in snap-acting connectors which must be destroyed in order to disassemble the modular unit.

Certain structures disclosed in the prior art have improved upon the modular panel structures described above. In U.S. Pat. No. 2,962,133 issued on Nov. 29, 1960 to J. S. Kivett, a connector assembly was disclosed for joining panels to posts and to other panels. No means for the attachment of brackets, though, was provided in the Kivett structure. Moreover, any attempt to cantilever loads from the Kivett panel connecting structure by means of brackets would tend to work against the clamping action of the connector which is required to hold the panels together. Additionally, the Kivett structure has poor resistance to bending at the panel-post joint and affords no vertical registration to insure the joining of panels at a uniform height.

In U.S. Pat. No. 3,267,631 issued on Aug. 23, 1966 to A. B. Hammitt, another type of connector assembly was disclosed. Again, no means for the attachment of brackets was provided and cantilevered loads would work against the clamping structure. Additional disadvantages to the Hammitt structure included the large, unsightly clamps for fastening panels and the lack of vertical registration.

U.S. Pat. No. 3,282,006 discloses a grooved post-panel system in which clips or connectors may be inserted into the ends of juxtaposed grooves to couple the structural components together. This approach requires access to either the top and/or the bottom of the posts and panels, which makes the structure difficult or impossible to use in floor to ceiling applications.

Other post-panel systems are disclosed in U.S. Pat. Nos. 4,145,856, 4,038,790, 3,921,347, 3,648,419, 3,431,692 and 2,766,858. These systems employ a variety of approaches to the coupling of modular structural components, but they tend to require many parts, be difficult to assemble or disassemble, unsightly, relatively costly to manufacture or lack durability and strength.

OBJECTS OF THE INVENTION

Accordingly, it is an object of the present invention to provide an modular panel structure with improved connector apparatus for joining vertically oriented panels to vertically extending posts and to other vertically oriented panels.

It is another object of the present invention to provide a modular panel structure with improved connector apparatus and bracket mounting means that are recessed to provide a safe and attractive structure.

It is a further object of the present invention to provide a modular panel structure with panel-post and panel-panel joints that are readily assembled and disassembled without requiring access to the top or bottom surfaces thereof.

It is still another object of the present invention to provide a modular panel structure with improved connector apparatus and bracket mounting means that form an accoustical sound barrier.

It is still a further object of the present invention to provide a modular panel structure with connector apparatus having improved stiffness in bending at panel-post and panel-panel joints and greater strength for support of cantilevered loads.

It is an additional object of the present invention to provide a modular panel structure with connector apparatus that includes means for vertical alignment and registration of the panels.

The connector apparatus of the present invention has other objects and features of advantage which will become apparent from and are set forth in more detail in the accompanying drawing and the following description of the preferred embodiment.

SUMMARY OF THE INVENTION

The connector apparatus of the present invention includes groove defining means, preferably grooved rails, affixed to one structural component, for example a panel, and groove defining means provided in a second structural component, such as a post. The apparatus further includes a connector assembly for joining the adjacent groove components together. The groove defining means are preferably formed as extruded members having T-shaped grooves running the length thereof. Posts may include multiple grooves at various orientations for use at corners formed by intersecting panels.

Each connector assembly is utilized to clamp adjacent grooves together to join a panel to either a post or another panel. The connector assembly consists of two C-shaped channels in parallel alignment, and a plurality of threaded elements positioned periodically along the length of the channels and threadedly engaged to the channels. The channels are arranged so that their webs are parallel and so that the two flanges of each channel face outward. Means for mounting brackets to the channels are provided either by periodically spaced slots in the webs of the channels or a slotted U-shaped member secured to the webs of the channels. When slotted webs are employed it is preferable to mount an intermediate plate, substantially equal in width to the channels, midway between the channels. Means for vertical registration of the panel may be provided by tabs that laterally protrude from the edges of the intermediate plate which mate with corresponding slots in the grooved posts and rails. The threaded elements have left and right hand threaded ends, each end threadedly engaging one channel, and when rotated act to increase or decrease the distance between channels.

To assemble a modular panel structure according to the present invention, panels are joined to posts and other panels using connector assemblies to connect adjacent grooves. To join a panel to a post, one side of a connector assembly is positioned with one flange of each channel within the groove of the post. Next, the panel to be joined is positioned such that the other flanges of the connector assembly are positioned within the grooved rail of the panel. Finally, the threaded elements of the connector assembly are rotated to expand the channels, forcing the flanges into the corners of the T-shaped grooves and locking the panel to the post.

DESCRIPTION OF THE DRAWING

FIG. 1 is a top plan view of both an assembled and a disassembled post-panel joint constructed in accordance with the present invention.

FIG. 2 is a fragmentary, top perspective view of the connector assembly of the present invention.

FIG. 3 is a top plan view of an alternative embodiment of a panel-panel joint constructed in accordance with the present invention.

FIG. 4 is a fragmentary, top perspective view of the connector of FIG. 3.

DESCRIPTION OF THE PREFERRED EMBODIMENT

A modular panel structure, constructed in accordance with the present invention, includes a connector apparatus for joining a panel 25 (shown in phantom) to a post 19, as shown in FIG. 1. The connector apparatus of the present invention includes groove defining means, generally designated 27, affixed to the panel, groove defining means, generally designated 21, formed in the post, and a connector assembly 31 for joining adjacent grooved post and panel. The outside periphery of post 19 is advantageously square in horizontal cross-section and has a groove defining means 21 extending along each of its four sides. Groove defining means 21 is advantageously T-shaped with a throat portion or an open post groove 22 extending inwardly from the outside of the post and two transverse groove portions 23 extending laterally from opposite side walls of open groove 22. The post is preferably formed as two identical extruded members that overlap and are joined at 24.

A corresponding T-shaped groove is provided on panel 25 by groove defining means 27, which is preferably a grooved rail 27. Grooved rail 27 is affixed to a vertical edge of the panel such that its open panel groove portion 28 faces the corresponding open post groove 22 of post 19. Two transverse grooves 29 extend laterally from the side walls defining open panel groove 28, corresponding to transverse grooves 23 of the post. Grooved rail 27 is preferably formed as an extrusion and is affixed to the edge of panel 25 by conventional fastening means.

While in most applications a vertically oriented post and panel will be joined by the connector assembly of the present invention, it will be understood that the present connector apparatus can be employed with horizonally oriented structural components of various descriptions. The connector apparatus of the present invention does not depend upon either vertical orientation of the juxtaposed structural components nor the exclusive use of posts and panels. As will be seen in FIG. 3, for example, the connector apparatus of the present invention is used to join two panels.

Each connector assembly 31 is utilized to clamp adjacent grooved rails 27 and groove defining means 21 together to join a panel 25 to a post 19. The connector assembly, shown in FIG. 2, consists of two C-shaped channels 33 and 35 in parallel alignment, an intermediate plate 37 positioned between and parallel to the channels, and a plurality of transversely extending threaded elements 39 positioned periodically along the length of the channels and plate and threadedly engaged to the channels. (Only the top element 39 is shown in FIG. 2.) Channels 33 and 35 are arranged so that their webs 50 are parallel and so that the two flanges 41 of each channel face outward. Intermediate plate 37 is substantially equal in width to channels 33 and 35 and is positioned midway therebetween. Threaded elements 39 have left and right hand threaded portions 38 and 40, respectively. Each end of the threaded element is threadedly engaged to web 50 of a channel, while the center of the threaded element is slip fit into intermediate plate 37. At least one end, and preferably both ends, of the threaded elements have a drive socket 49 therein. When the threaded elements are rotated by means of a tool engaged in drive sockets 49, the threaded elements act to increase or decrease the distance between channels 33 and 35.

To assemble a modular panel structure according to the present invention, panel 25, is joined to post 19 by using connector assembly 31 to connect adjacent grooves 21 and grooved rails 27.

As best may be seen in connection with connector assembly 31a of FIG. 1, the channels 33a and 35a can be collapsed to a retracted position by rotating threaded elements 39a. In the retracted position of channels 33a and 35a it is possible for a panel 25a to be brought in transversely from the side, as indicated by arrow 43, until it abuts connector 31a. Since channels 33a and 35a are retracted, they do not interfere with the transverse movement of the panel toward post 19 so that groove 21 and grooved rail 27a an be joined. Once together, a tool, such as an Allen head wrench, can be inserted from either side of the assembly through the slot or space 45a between the post and panel to rotate the threaded element 39a. When the threaded element is rotated, it moves channels 33a and 35a to an expanded position, allowing flanges 41a to interlock with transverse grooves 23 and 29a.

The connector apparatus according to the present invention can also be utilized to join panels to other panels. For the panel-panel joint illustrated in FIG. 3, the groove defining means are provided by grooved rails 27b, which have a slightly different construction than rails 27 and 27a but again provide T-shaped grooves. Rails 27b are affixed by fasteners 55 in notches 57 to adjacent edges of panels 25, and connector assembly 31b connects the adjacent rails and will be described more fully below. Notches 57 are dimensioned so that there will be a space or slot 59 between juxtaposed panels 25 for access to the sockets for expansion and retraction of connector assembly 31b. As will be appreciated, it is advantageous for groove defining rails 27b and connector assembly 31b to extend over the entire length of the structural component, but the grooved structure and connector can alternatively be provided only periodically along the length of two components.

One advantage to forming the panel-panel and the panel-post joints in the above-described manner, is that the bending stiffness of the joint is improved, Expanding C-shaped channels against T-shaped grooves results in the connector engaging the grooves at widely spaced apart locations, thereby enhancing the resistance to bending about a vertical axis. Another advantage is that the panels and posts can be brought together by sliding the panels laterally towards each other with the connector assembly positioned therebetween. It is not necessary, therefore, to have access to the top or bottom of the panel and post, making the present invention particularly well suited for floor to ceiling partitions and walls.

Another feature of the present invention is to provide means for mounting brackets to the post-panel assembly. As may be seen in FIG. 2, channels 33 and 35 are formed with slots 47 periodically spaced along the length of webs 50 of the channels. Slots 47 accept the hook-shaped feet 46 of bracket 48 that is utilized for supporting various structures from the connector apparatus. Bracket 48 may be constructed according to any of a number of methods known to exist in the prior art for brackets adapted for use with slotted channels. It is preferable that both channels 33 and 35 have slots 47 therein so that a bracket can be supported from either side of the panel 25. The bracket mounting means thus provided are recessed within space 45 to improve appearance and safety.

Sound isolation between the two sides of panel 25 is provided by the presence of the solid intermediate plate 37 between the channels. It is also desirable for improved appearance to provide caps 54 for positioning within the unused grooves 21 of post 19.

It is a further important feature of the post and panel connector assembly of the present invention that cantilevered loads on bracket 48 tend to drive flanges 41 out into transversely facing groove 23 and 29. Thus, weight cantilevered from brackets 48 tends to maintain or increase the interengagement of connector 31 with the post and panel grooves.

In order to assist in indexing and positively locating the post and panel with respect to each other and to the connector assembly, it is preferable to provide vertical registration means. Such means are provided by tabs 51 that laterally project from the edges of intermediate plate 37 and which couple to correspondingly located slots 53 in the post groove 21 or grooved rail 27. More preferably, the tabs occur periodically over the length of plate 37, and the post grooves or grooved rails are similarly formed with mating slots 53 which register with the projections and lock the post and panel together against relative vertical shifting. Alternatively, vertical registration means can be provided on channels 33 and 35, but corresponding horizontal slots or recesses must be formed in groove defining means 21 and 27.

As best may be seen in FIG. 4, connector 31b is constructed in a manner which differs from connector 31. Connector 31b includes two C-shaped channels 33b and 35b to which U-shaped slotted members 61 and 63 are secured, for example, by welding. Members 61 and 63 afford a structure to which brackets 48 can be secured. Additionally, the webbing portion of channels 33b and 35b is now solid and an intermediate plate, such as member 37, is not required to provide a sound barrier.

The tool used to turn threaded element 39b can be inserted through slot 47b in members 61 and 63, and the spacing of slots 47b outwardly of the webbing has the additional advantage that the threaded elements will not interfere with the hooks 46 on the brackets as they drop down into the slots. Such interference is possible with connector 31 depending upon the location of the brackets and the spacing of the slots relative to threaded elements 39. A further advantage of U-shaped members 61 and 63 is that they increase the overall connector rigidity.

What is claimed is:

1. In a modular panel system including a panel; a structural member; a connector assembly coupling said panel to said structural member; and a support bracket having hook-like feet coupled to said connector assembly for support of a load therefrom; said panel and said structural member each including groove defining means, said groove defining means providing a groove extending along an edge of each of said panel and said structural member having an open groove portion extending inwardly and two transverse groove portions extending laterally from opposite side walls of said open groove portion, said connector assembly including first and second C-shaped channels disposed between said panel and said structural member in back-to-back relation, said channels each having two flanges disposed at substantially right angles to a connecting web, said flanges on one end of each of said channels engaging said transverse groove portions of said panel on opposite sides of said open groove portion, and said flanges on the other end of each of said channels engaging corresponding sides of said transverse groove portions of said structural member, said connector assembly also including a threaded element mounted to one of said channels, wherein the improvement in said modular panel system comprises:

said threaded element is disposed between said first and second C-shaped channels, the web of said first channel being threadedly engaged to a right-hand thread portion of said threaded element and the web of said second channel being threadedly engaged to a left-hand thread portion of said threaded element to hold said first channel, said second channel and said threaded element together as a manipulatable unit, said threaded element being operable from either side of said connector assembly for changing the distance between said channels upon rotation of said threaded element, and a longitudinally extending U-shaped member secured to the other side of each of the webs of said first channel and second C-shaped channels, said U-shaped member having a plurality of slots closely spaced along the length thereof and receiving said hook-like feet of said support bracket therein to load said webs in a direction urging said flanges into said grooves, said threaded element being dimensioned to be substantially flush with the outer surface of said webs when said flanges are fully interengaged with said grooves, and said webs having a thickness dimension along said threaded element allowing full disengagement of said flanges from said groove for removal of said connector assembly as a unit from said panel structure.

2. Connector apparatus as defined in claim 1 additionally comprising, an intermediate plate disposed mid-way between said C-shaped channels, said intermediate plate acting as a central anchor plate for said threaded element.

3. Connector apparatus as defined in claim 2 wherein, said intermediate plate has at least one tab protruding laterally from each vertical edge thereof; and said groove defining means having slots adjacent to said tabs for receiving said tabs to insure proper vertical positioning of said panel with respect to said structural member.

* * * * *